UNITED STATES PATENT OFFICE.

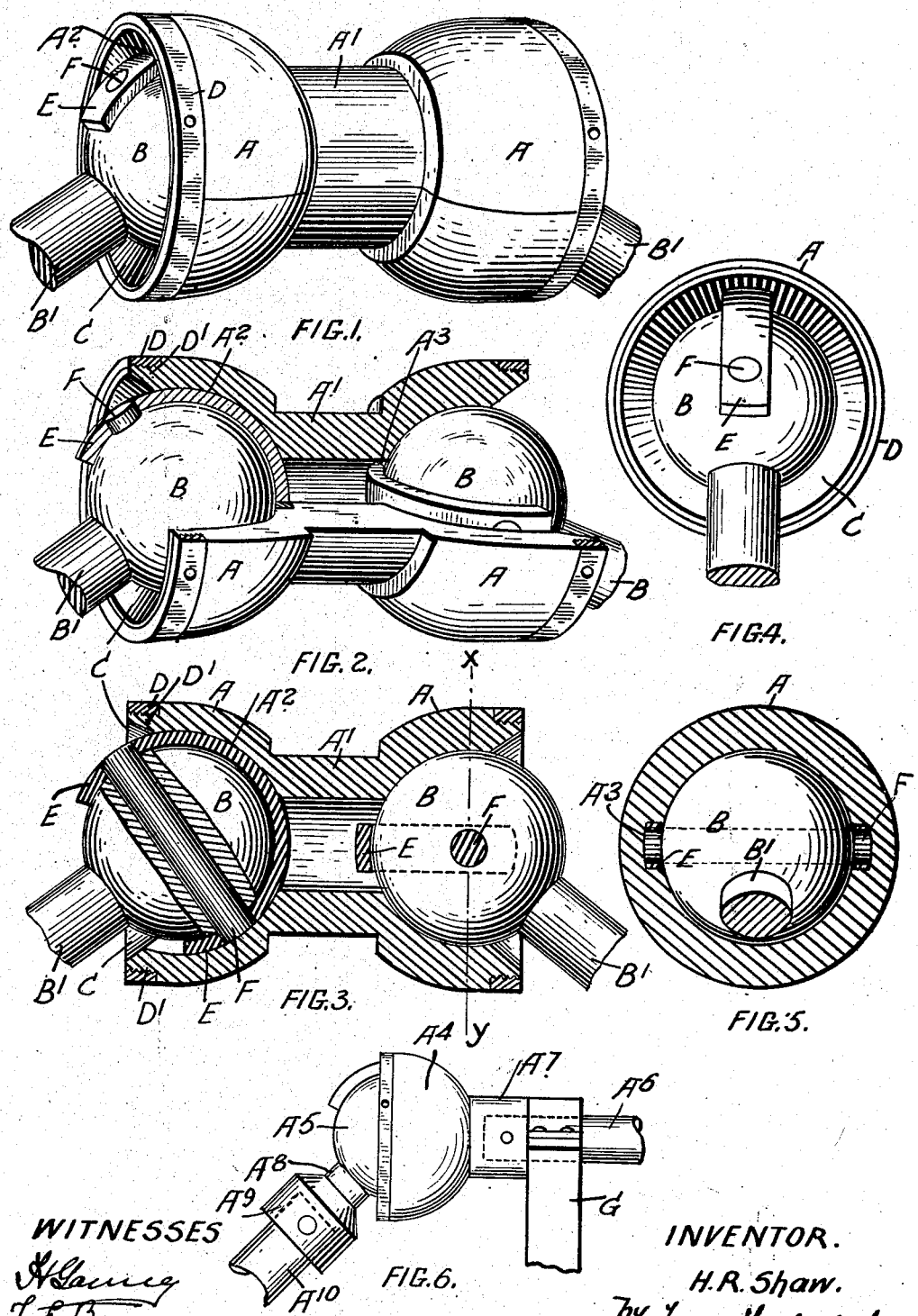

HUGH ROBERTSON SHAW, OF ROSSEAU, ONTARIO, CANADA.

POWER-TRANSMISSION UNIVERSAL JOINT.

No. 899,913.　　　Specification of Letters Patent.　　Patented Sept. 29, 1908.

Application filed December 13, 1907. Serial No. 406,294.

*To all whom it may concern:*

Be it known that I, HUGH ROBERTSON SHAW, of the village of Rosseau, in the district of Parry Sound, in the Province of Ontario, Canada, have invented certain new and useful Improvements in Power-Transmission Universal Joints, of which the following is the specification.

My invention relates to improvements in power transmission universal joints, and the object of the invention is to devise a simple, cheap, strong, durable, effective and noiseless running universal joint or coupling by which power may be transmitted from one member of the joint to the other without any lost motion or slip.

A further object is to so construct the universal joint that a greater range of adjustment of angle than has heretofore been possible may be effected and with but a minimum amount of friction.

To effect these objects I have constructed my joint or coupling either in double or single form, the sockets being provided with internal recesses or grooves and the balls fitting therein with segments of rings, which are secured on the balls and work in the recesses or grooves as the joint rotates, the balls being retained in position in the sockets and the parts being otherwise constructed and arranged as hereinafter more particularly explained.

Figure 1, is a perspective view showing my improved power transmission universal joint in double form. Fig. 2, is a similar view to Fig. 1, the socket being, however, partly in section. Fig. 3, is a longitudinal section through the socket shown in Figs. 1 and 2 also showing one of the balls and the segments thereof in section. Fig. 4 is an end view of the joint. Fig. 5, is a cross section on the line $x$—$y$ Fig. 3. Fig. 6, is a detail showing a joint in single form.

In the drawings like letters of reference indicate corresponding parts in each figure.

A A is the double socket connected by a hollow shank A'. The double socket A A and shank A' are made in two halves, the division being in a plane passing through the axis of the shank. One socket A is provided with an arc-shaped recess or groove $A^2$ and the opposite socket A, is provided with an arc-shaped groove or recess $A^3$, which is preferably at right angles to the groove $A^2$. Each socket is preferably made internally, so as to receive a spherical ball B, the size of the socket being slightly greater than the hemisphere of the ball. The outer end of each socket is provided with a flaring mouth C, and the two parts of the socket are secured together at the ends by the internally threaded ring D fitting on to the reduced cylindrical outer portions D' of the socket.

The balls B B are each provided with the usual stems B' B' and such stems may form part of the ball or part of a shaft and extend into the ball. As indicated in Fig. 6 the socket may be formed in the end of the stem in which the end of the shaft is secured. Instead of the shaft being secured to the balls a driving gear may be secured or other power transmission device.

Each ball B has secured to it a segment of a ring E by a pin F passing diametrically through the ball and the segment near the ends. As will be seen from the drawings the ring extends over more than one-half of the circumference of the ball. The segments E fit in the grooves $A^2$ and $A^3$, one segment on one ball being preferably at right angles to the longitudinal plane of the segment of the opposite ball.

In Fig. 6, I show a modification in which there is one socket $A^4$ and ball $A^5$, the shaft $A^6$ being connected to a supplemental socket $A^7$ formed at the outer end of the socket $A^4$. The ball $A^5$ has a stem $A^8$ having a socket $A^9$ receiving a shaft $A^{10}$, which is suitably secured in the same. The shaft $A^6$ is journaled in bearings G.

In the forms shown the segment is shown on the ball and the groove in the socket and the two halves of the double socket are shown connected together by end rings.

In practice I find that shafts connected by my joint may be driven at anything from a straight line with each other and to a position of 135° approximately as shown in Fig. 6 in the single form and to a position at right angles to each other as shown in the double form or even less. I have driven them at an angle of 70° in relation to each other, the flaring mouth C permitting of this adjustability. Such a universal joint or coupling as I describe is also adaptable for very high speeds, which is an important desideratum.

What I claim as my invention is:

1. A power transmission joint or coupling comprising a ball member, a segment of a ring secured on the ball member and extending over more than one-half of the circumference of the same, and a socket member having the interior thereof in excess of a hemisphere and provided with an arc-shaped groove located on a plane through the axis of rotation and extending from edge to edge of said socket member so as to form a continuous bearing surface for the segment on the ball from end to end as it adjusts itself in the groove during rotation as specified.

2. A power transmission joint or coupling comprising a ball member, a segment of a ring pivoted on the ball member and extending over more than one-half of the circumference of the same, and a socket member having the interior thereof in excess of a hemisphere and provided with an arc-shaped groove located on a plane through the axis of rotation and extending from edge to edge of said socket member so as to form a continuous bearing surface for the segment on the ball from end to end as it adjusts itself in the groove during rotation as specified.

HUGH ROBERTSON SHAW.

Witnesses:
B. BOYD,
R. COBAIN.